Sept. 14, 1948.　　　M. M. FLOOD　　　2,449,287
POLARIZING BEAM-SPLITTING PRISM
Filed Sept. 23, 1946
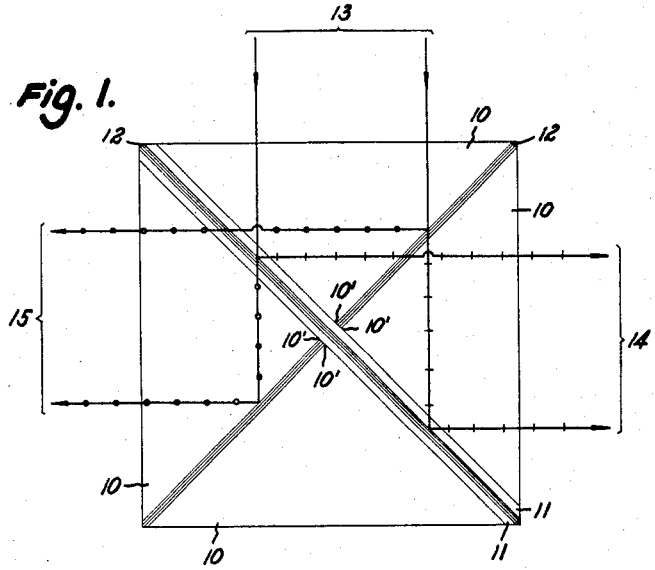
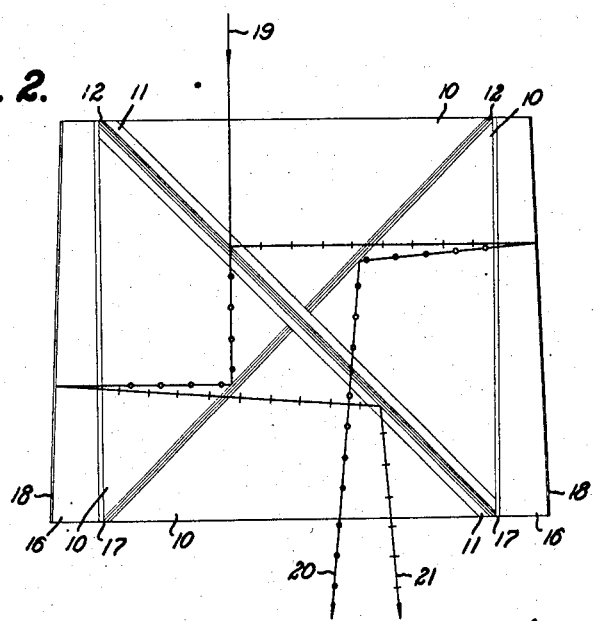
Inventor:
Merrill M. Flood
By Stowell & Evans
Attorneys.

Patented Sept. 14, 1948

2,449,287

UNITED STATES PATENT OFFICE 2,449,287

POLARIZING BEAM-SPLITTING PRISM

Merrill M. Flood, Washington, D. C.

Application September 23, 1946, Serial No. 698,829

4 Claims. (Cl. 88—65)

This invention relates to beam-splitting prisms and particularly to prisms adapted to split a beam of light into two divergent orthogonally polarized beams.

An object of the invention is to provision of a prism combination capable to splitting a beam of light into two divergent orthogonally polarized beams.

Another object of the invention is the provision of a prism combination having beam-splitting properties similar to those of Wollaston prisms and made from isotropic transparent materials.

Other purposes and advantages of the invention will be apparent from the following description.

As is well known, the Wollaston prism consists of two wedges of birefringent material, such as quartz, arranged with the optical axis of one wedge at right angles to the optical axis of the other, whereby a beam of light entering the prism is split into two divergent orthogonally polarized beams.

I have found that a similar effect may be obtained by the use of prism sections of isotropic material such as glass or isotropic transparent plastic compositions, in combination with suitable polarizing, wave-retarding, and reflecting layers and surfaces.

In general, the prism construction of the invention comprises four right-angle prisms of isotropic transparent material mounted with their right-angle edges in juxtaposition to form a composite prism, a pair of half-wave retardation plates between adjacent faces of the right-angle prisms along one diagonal interface of the composite prism, a polarizing beam-splitting layer between the half-wave retardation plates, and a polarizing beam-splitting layer between adjacent faces of the right-angle prisms along the other diagonal interface of the composite prism.

Multiple layers consisting of alternate laminae of alternating high and low index of refraction and having an effective optical thickness of about one-quarter the wavelength of the incident light, as described in United States Patent No. 2,403,731, issued July 9, 1946 to Stephen M. MacNeille, are particularly suitable polarizing beam-splitting layers for use in the prism combinations of the present invention.

The prism combination described above may be used in combination with additional reflecting and retarding surfaces, layers and prisms to provide combinations of high utility in range-finders and other optical apparatus.

The invention will be more particularly described for the purpose of illustration with reference to the accompanying drawing in which:

Fig. 1 is a diagrammatic end view of a beam-splitting prism combination embodying the principles of the invention, and Fig. 2 is a diagrammatic end view of a prism including the combination prism of Fig. 1 and having the properties of a Wollaston prism.

In Fig. 1, 10 are substantially identical right-angle prisms of isotropic transparent material, such as glass, mounted with their right-angle edges 10' in approximate juxtaposition to form a composite prism. Along one of the diagonal interfaces of the composite prism is a pair of half-wave retardation plates 11, 11. Between the half-wave plates and also along the other diagonal interface of the composite prism are beam-splitting polarizing layers 12, 12 of the type described above comprising a plurality of thin transparent laminae each of approximately quarter-wave effective optical thickness (about 550 millimicrons optical thickness is suitable for the visible spectrum) and alternately of high and low index of refraction.

A beam of light 13 entering one external face of the composite prism is split into two orthogonally polarized beams 14, 15. The beam 14 reflected to the right is conveniently marked to indicate plane polarization with the electric vector in the plane of the drawing, while the beam 15 reflected to the left is conventionally marked to indicate plane polarization with the electric vector perpendicular to the plane of the drawing.

Fig. 2 shows a composite prism adapted to split an incident beam of light into orthogonally polarized beams diverging at a slight angle as is typical of the usual Wollaston prism. In this prism members 10, 11 and 12 are similar to the members so designated in Fig. 1. A pair of symmetrically disposed wedge prisms 16 are positioned adjacent opposite faces of the composite prism with intervening quarter-wave retardation plates 17. The wedge prisms 16 have fully reflecting outer surfaces 18.

A ray of incident light 19 is split into two orthogonally polarized rays reflected in opposite directions as in Fig. 1, but the split rays are reflected back into the prism by the reflecting outer surfaces 18 of the wedge prisms 16 and in their double passage through the quarter-wave plates their planes of polarization are reversed so that they are reflected out of the face of the prism opposite the entrant face as orthogonally polarized beams 20, 21 of low divergence.

It will be seen by those skilled in the art that other combinations of prisms, layers and reflecting surfaces may advantageously be used in combination with the composite prisms of the invention to provide optical devices of great utility in range finding, surveying, aerial mapping and the like.

I claim:

1. A polarizing beam-splitting prism comprising four right-angle prisms of isotropic transparent material mounted with their right angle edges in juxtaposition to form a composite prism, a pair of half-wave retardation plates between adjacent faces of the right-angle prisms along one diagonal interface of the composite prism, a polarizing beam-splitting layer between the half-wave retardation plates, and a polarizing beam-splitting layer between adjacent faces of the right-angle prisms along the other diagonal interface of the composite prism said polarizing beam splitting layers polarizing light by reflection and refraction of light incident at the polarizing angle.

2. A polarizing beam-splitting prism comprising four right-angle prisms of isotropic transparent material mounted with their right angle edges in juxtaposition to form a composite prism, a pair of half-wave retardation plates between adjacent faces of the right-angle prisms along one diagonal interface of the composite prism, a polarizing beam-splitting layer between the half-wave retardation plates, a polarizing beam-splitting layer between adjacent faces of the right-angle prisms along the other diagonal interface of the composite prism, a pair of wedge prisms symmetrically disposed adjacent opposite faces of said composite prism, a reflecting layer adjacent the outer faces of said wedge prisms, and quarter-wave retardation plates between said wedge prisms and said composite prism said polarizing beam splitting layers polarizing light by reflection and refraction of light incident at the polarizing angle.

3. A polarizing beam-splitting prism comprising four right-angle prisms of isotropic transparent material mounted with their right angle edges in juxtaposition to form a composite prism of rectangular cross-section, a pair of half-wave retardation plates between adjacent faces of the right-angle prisms along one diagonal interface of the composite prism, a polarizing beam-splitting layer between the half-wave retardation plates, and a polarizing beam-splitting layer between adjacent faces of the right-angle prisms along the other diagonal interface of the composite prism, said polarizing beam-splitting layers comprising a plurality of laminae of alternately high and low index of refraction each lamina having an effective optical thickness of approximately one-quarter of the wavelength of visible light.

4. A prism having the optical beam-splitting properties of a Wollaston prism comprising four right-angle prisms of isotropic transparent material mounted with their right-angle edges in juxtaposition to form a composite prism of rectangular cross-section, a pair of half-wave retardation plates between adjacent faces of the right-angle prisms along one diagonal interface of the composite prism, a polarizing beam-splitting layer between the half-wave retardation plates, a polarizing beam-splitting layer between adjacent faces of the right-angle prisms along the other diagonal interface of the composite prism, said polarizing beam-splitting layers comprising a plurality of laminae of alternately high and low index of refraction each lamina having an effective optical thickness approximately one-quarter of the wavelength of visible light, a pair of wedge prisms symmetrically disposed adjacent opposite faces of said composite prism, a reflecting layer adjacent the outer faces of said wedge prisms, and quarter-wave retardation plates between said wedge prisms and said composite prism.

MERRILL M. FLOOD.

REFERENCES CITED

The following references are of record in the file of this patent:

UNITED STATES PATENTS

| Number | Name | Date |
|---|---|---|
| 1,740,673 | Whitaker et al. | Dec. 24, 1929 |
| 1,963,127 | Gardner | June 19, 1934 |
| 2,403,731 | MacNeille | July 9, 1946 |

FOREIGN PATENTS

| Number | Country | Date |
|---|---|---|
| 460,666 | Great Britain | Jan. 28, 1937 |